(12) United States Patent
Balk

(10) Patent No.: US 9,908,711 B2
(45) Date of Patent: Mar. 6, 2018

(54) CONVEYOR FOR CONVEYING PRODUCTS IN VERTICAL DIRECTION

(71) Applicant: Ambaflex International B.V., Zwaag (NL)

(72) Inventor: Wouter Balk, Baambrugge (NL)

(73) Assignee: AMBAFLEX INTERNATIONAL B.V., Zwaag (NL)

( * ) Notice: Subject to any disclaimer, the term of this patent is extended or adjusted under 35 U.S.C. 154(b) by 0 days.

(21) Appl. No.: 15/126,958

(22) PCT Filed: Mar. 19, 2015

(86) PCT No.: PCT/NL2015/050176
§ 371 (c)(1),
(2) Date: Sep. 16, 2016

(87) PCT Pub. No.: WO2015/142176
PCT Pub. Date: Sep. 24, 2015

(65) Prior Publication Data
US 2017/0096302 A1   Apr. 6, 2017

(30) Foreign Application Priority Data
Mar. 19, 2014   (NL) .................................. 2012475

(51) Int. Cl.
*B65G 17/06*   (2006.01)
*B65G 21/18*   (2006.01)
(Continued)

(52) U.S. Cl.
CPC ........... *B65G 21/20* (2013.01); *B65G 17/002* (2013.01); *B65G 17/066* (2013.01);
(Continued)

(58) Field of Classification Search
CPC ..... B65G 17/066; B65G 17/385; B65G 21/22
See application file for complete search history.

(56) References Cited

U.S. PATENT DOCUMENTS

| 5,458,228 A | 10/1995 | Olsson |
| 6,336,551 B1 * | 1/2002 | Balk .................... B65G 17/066 198/778 |

(Continued)

FOREIGN PATENT DOCUMENTS

| EP | 2644538 A1 | 2/1994 |
| EP | 9214064 U1 | 2/1994 |

(Continued)

OTHER PUBLICATIONS

International Search Report and Written Opinion for International application No. PCT/NL2015/050176, dated Sep. 1, 2015.

*Primary Examiner* — Thomas Randazzo
(74) *Attorney, Agent, or Firm* — Steven M. Koehler; Westman, Champlin & Koehler, P.A.

(57) ABSTRACT

A conveyor for conveying products in a vertical direction comprises a frame and a drivable conveyor belt supported by the frame and following a helical track about a central centerline. The belt is provided with movable slats having upwardly directed support faces. Inner rollers and outer rollers are present at the lower side of the belt having inner axes and outer axes of rotation, respectively, which are angled with respect to the support faces. The outer rollers are located at a larger distance from the centerline than the inner rollers. The frame is provided with a first guide face for supporting the outer rollers in an outward direction which first guide face is radially directed in the outward direction and with an upwardly directed second guide faces for supporting the belt in the upward direction, which second guide face lies at a distance from the first guide face.

25 Claims, 6 Drawing Sheets

(51) Int. Cl.
*B65G 21/20* (2006.01)
*B65G 17/38* (2006.01)
*B65G 39/20* (2006.01)
*B65G 17/00* (2006.01)
*B65G 21/22* (2006.01)

(52) U.S. Cl.
CPC ........... *B65G 17/385* (2013.01); *B65G 21/18* (2013.01); *B65G 21/22* (2013.01); *B65G 39/20* (2013.01)

(56) References Cited

U.S. PATENT DOCUMENTS

| | | | |
|---|---|---|---|
| 7,963,389 B2 * | 6/2011 | Broers | B65G 17/066 |
| | | | 198/778 |
| 8,011,496 B2 * | 9/2011 | Seger | B65G 21/18 |
| | | | 198/778 |
| 8,100,254 B2 * | 1/2012 | Balk | B65G 47/261 |
| | | | 193/35 A |
| 9,365,352 B2 * | 6/2016 | Balk | B65G 21/18 |
| 9,561,907 B2 * | 2/2017 | Hoang | B65G 17/066 |
| 2010/0089724 A1 | 4/2010 | Broers et al. | |
| 2015/0083552 A1 | 3/2015 | Balk | |

FOREIGN PATENT DOCUMENTS

| | | |
|---|---|---|
| EP | 1902978 A1 | 3/2008 |
| SE | 468809 B | 3/1993 |

\* cited by examiner

CONVEYOR FOR CONVEYING PRODUCTS IN VERTICAL DIRECTION

CROSS-REFERENCE TO RELATED APPLICATION

The present application is a national stage filing of International patent application Serial No. PCT/NL/2015/050176, filed Mar. 19, 2015, and published as WO 2015/142176 A1 in English.

BACKGROUND

The discussion below is merely provided for general background information and is not intended to be used as an aid in determining the scope of the claimed subject matter.

The present disclosure relates to a conveyor for conveying products in vertical direction, comprising a frame and a drivable conveyor belt being supported by the frame and following a helical track in a direction of conveyance about a central centerline and being provided with slats which are movable with respect to each other and have a support face at their upper sides, wherein inner rollers and outer rollers are present at the lower side of the conveyor belt, which rollers are rotatable about inner axes of rotation and outer axes of rotation, respectively, which are angled with respect to the support face and wherein the outer rollers are located at a larger distance from the central centerline than the inner rollers.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An apparatus including a frame provided with a first guide face for supporting outer rollers in an outward direction with respect to a central centerline which first guide face is directed radially in the outward direction and with an upwardly directed second guide face for supporting the conveyor belt in an upward direction, which second guide face lies at a distance from the first guide face.

Since the first guide face supports the outer rollers of the respective slats in a radial direction the tendency of the slats to jump up is relatively small under operating conditions. The presence of the inner roller allows the conveyor belt to be guided through a reverse curve in an upstream or downstream track.

The second guide face may at least partly be located between the inner and outer axes of rotation in a radial direction with respect to the central centerline. This allows for a compact assembly. Possibly, the second guide face is at least partly located between the inner rollers and the outer rollers in a radial direction with respect to the central centerline.

In an alternative embodiment the second guide face is at least partly located outside a range between the inner and outer axes of rotation in a radial direction with respect to the central centerline.

It is also possible that the second guide face is at least partly located at at least one of the inner rollers and the outer rollers so as to support the conveyor belt in the upward direction via at least one of the inner rollers and the outer rollers.

In another alternative embodiment the second guide face is at least partly located outside the inner rollers and the outer rollers in a radial direction with respect to the central centerline.

As seen in an axial direction of the outer axis of rotation the second guide face may at least partly be located at a distance from the first guide face at a slat.

In order to maximize stability of the separate slats the second guide face may comprise at least two segments which are located at a distance from each other in a radial direction with respect to the central centerline. The segments may be located symmetrical with respect to the centerline of the conveyor belt.

In a practical embodiment the inner rollers and the outer rollers are located at opposite sides of the centerline of the conveyor belt along the helical track.

In a particular embodiment the second guide face comprises the outer circumferences of supporting rollers, which are rotatable about respective axes of rotation which extend in a radial direction with respect to the central centerline. The second guide face may constitute a narrow roller track, for example.

In order to reduce the risk of jumping up of the slats further the frame may be provided with a third guide face for holding down the slats, which third guide face is directed downwardly, wherein the third guide face is located at a distance from the first guide face. Preferably, at a slat the third guide face lies at the lower side thereof such that the support face is left free.

The third guide face may be positioned such that it cooperates with at least one of the outer rollers and the inner rollers.

The third guide face may cooperate with the inner rollers at portions of sides thereof which are located closest to the outer rollers.

In a practical embodiment at least one of the inner and outer axes of rotation extend perpendicular to the respective support faces of the slats.

Each of the slats may be provided with an inner roller and an outer roller, which are mounted directly on a portion of the slat, which portion comprises the support face.

The slats may be connected to each other at the centerline of the conveyor belt along the helical track, for example via a connecting member, such as a chain. The connecting member may be driven such that the slats are moved ahead. In case the slats are connected directly to each other the slats pull each other ahead along the helical track.

In a specific embodiment the connecting member rests on the second guide face, such that the conveyor belt is supported by the second guide face through the connecting member. Under operating conditions the connecting member may slide on the second guide face, for example. The connecting member may be a chain, but it is also conceivable that the connecting member comprises a roller chain. In the latter case the chain rollers roll on the second guide face.

In a practical embodiment the inner and outer axis of rotation lie substantially in a single plane at a slat, which plane extends in radial direction with respect to the central centerline.

Furthermore, the slats may be elongated wherein the longitudinal direction of the slats extends perpendicular to the direction of conveyance.

The plane as mentioned above may run through the centerline in the longitudinal direction of the slat.

In a particular embodiment the slats extend beyond the second guide face as seen from the centerline of the conveyor belt in their longitudinal direction. This is advantageous in that on a short distance from the conveyor belt a parallel conveyor belt including a support can be arranged.

BRIEF DESCRIPTION OF THE DRAWINGS

Aspects of the invention will hereafter be elucidated with reference to drawings showing embodiments of the invention schematically.

DETAILED DESCRIPTION OF THE ILLUSTRATIVE EMBODIMENTS

Figure 1:
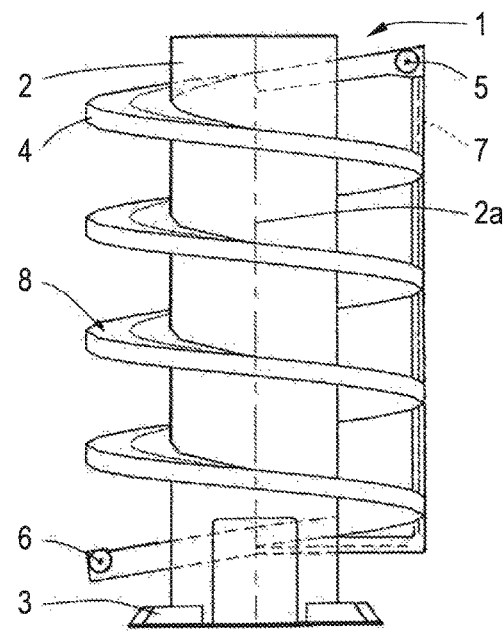
FIG. 1 is a side view of an embodiment of the conveyor

FIG. 1 sows a conveyor for conveying products in vertical direction via a helical conveying track. The conveyor as shown comprises a frame 1, which is provided with a central column 2 including feet 3 and a helical guide chute 4 which is mounted to the frame 1. The central column 2 has a central centerline 2a about which the helical conveyor track runs. At the upper and lower end of the guide chute 4 a reel 5, 6 is disposed and a return chute 7 of the frame 1 extends between these ends of the helical guide chute 4.

The conveyor further comprises a drivable endless conveyor belt 8 being supported by the frame 1 which follows the helical track in a direction of conveyance about a central centerline 2a. The conveyor belt 8 is supported by the frame 1 in the helical track and guided in a return portion at the return chute 7 along another track.

FIG. 1 shows four windings of the guide chute 4, but the number may be larger or smaller. The end reel 5 or 6 and if desired auxiliary drive means on other locations in the conveyor track, can be driven by means of a drive means such as a drive motor. A linear drive of the conveyor belt 8 is possible, as well.

The conveyor belt 8 is provided with a large number of slats 9 which are mutually coupled. The slats 9 are elongated and the longitudinal direction of the slats 9 extend perpendicular to the direction of conveyance. The slats 9 may be coupled directly to each other or indirectly via an endless connecting member, such as a chain. In the embodiment as shown the upper side of a slat 9 has a flat support face. The slats are close to each other such that a single product can be supported and conveyed by a number of adjacent slats 9.

In the embodiment as shown the slats 9 are pivotably connected to each other. The slats are pivotable with respect to each other about a first axis parallel to the support face thereof and perpendicular to the direction of conveyance as well as a second axis perpendicular to the support face. The latter pivoting movement allows to follow the helical path whereas the former pivoting movement allows bending of the conveyor belt 8 about the end reels 5 and 6.

Since the slats 9, as seen from the centerline of the conveyor belt 8, are somewhat tapered close to their ends, the slats 9 do not hinder each other in the curves. Alternative shapes, such as a diamond shape, V-shape, a toothed shape, and also overlapments or a combination thereof are possible.

Figure 2:
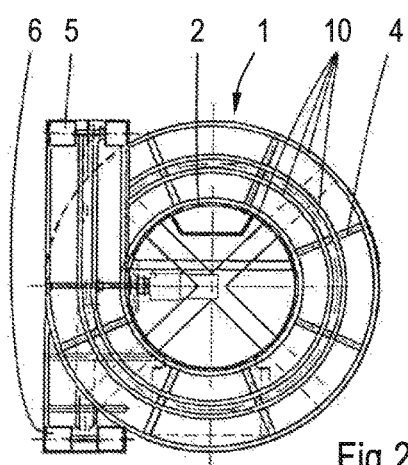
FIG. 2 is a plan view of the frame of the conveyor of FIG. 1.
Figure 3:
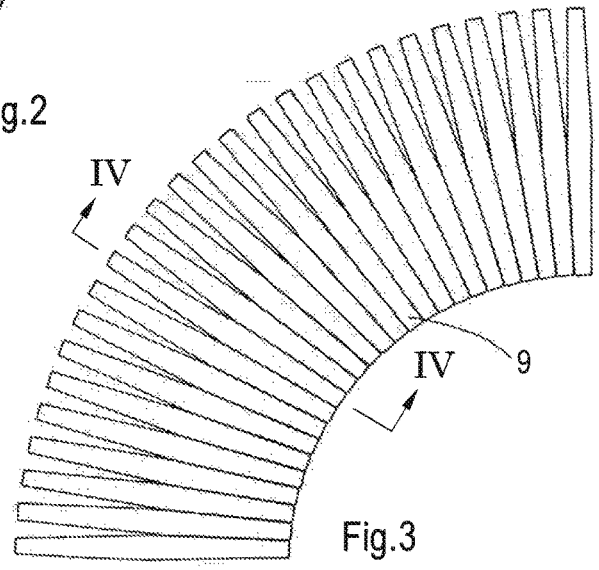
FIG. 3 is a plan view on a larger scale, showing the slats of a small part of the conveyor belt of the conveyor according to FIGS. 1 and 2 in the helical track.
Figure 4:
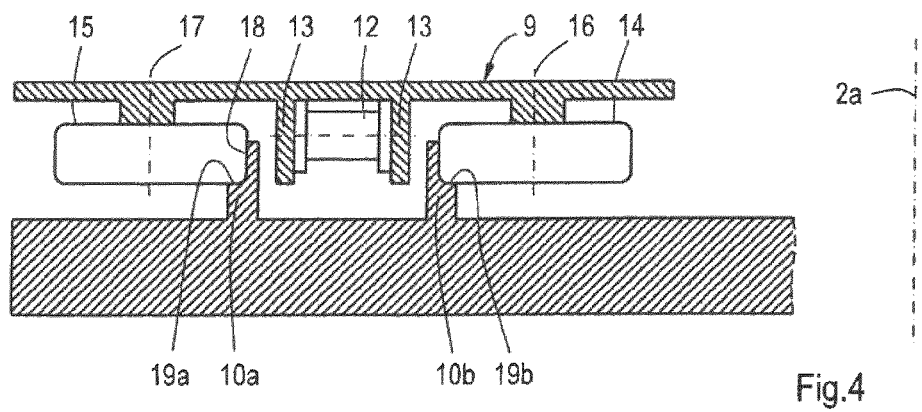
FIG. 4 is a sectional view along the line IV-IV in FIG. 3 on a larger scale.

FIGS. 2 and 4 show that the guide chute 4 of the frame 1 is provided with the helical profiles 10 for supporting the conveyor belt 8. Below it will be explained that embodiments with a different number of helical profiles 10 exist, indicated with reference signs 10a-10d.

FIG. 4 shows that in this embodiment the slats 9 are mutually connected through a connecting member in the form of a chain 12, for example a so-called 'side-bow' chain or space chain which allows bending in two directions and twisting, such that the chain 12 can follow the helical path. As shown in FIG. 4 the lower side of the slat 9 is mounted to the chain 12 between two downwardly directed vertical flanges 13 of the slat 9.

The lower side of the slat 9 is also provided with an inner roller 14 and an outer roller 15, which are rotatable about an inner rotational axis 16 and outer rotational axis 17, respectively. The outer roller 15 lies at a larger distance from the central centerline 2a than the inner roller 14. In the embodiment as shown in FIG. 4 the inner roller 14 and outer roller 15 have the same dimensions and a cylindrical running surface, but different dimensions and shapes are possible. Also in this case the inner rotational axis 16 and the outer rotational axis 17 are perpendicular to the support face of the slat 9, but an angle to the support face is also conceivable.

As can been seen at the slat 9 as shown in FIG. 4 the inner and outer rotational axes 16, 17 lie in a common plane which extends in radial direction with respect to the central centerline 2a. The centerline of the slat 9 in the longitudinal direction lies in this plane, such that the slat 9 with the inner roller 14 and the outer roller 15 is symmetrical in the direction of conveyance.

Figure 15:
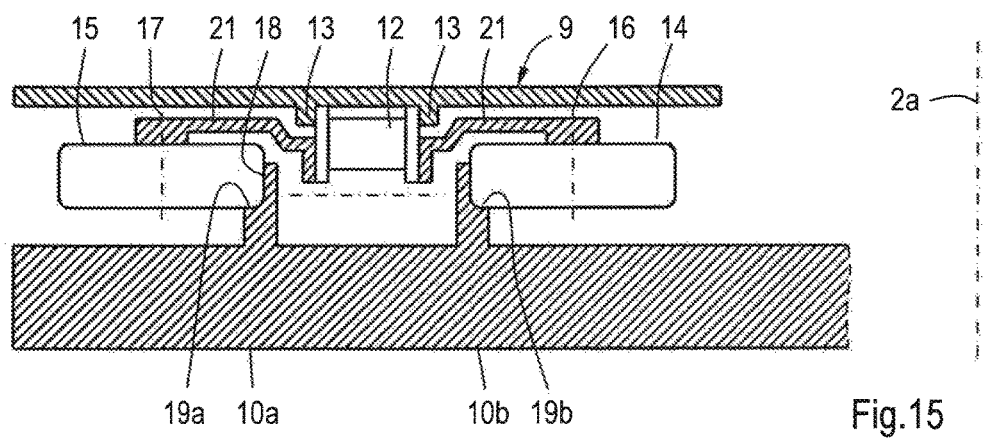

In FIG. 4 the guide profiles 10 are indicated as an outer guide profile 10a and an inner guide profile 10b. FIG. 4 shows that the outer roller 15 cooperates with a radially outwardly directed first guide surface 18 of the outer guide profile 10a. Hence, under operating conditions the outer rollers 15 of the slats 9 run on the first guide surface 18. The inner roller 14 and the outer roller 15 are mounted directly on the portion of the slat 9 which comprises the support face in this case, but could be part of the chain 12 in an alternative embodiment, such that the inner roller 14 and the outer roller 15 are indirectly part of the slat 9. This is illustrated in FIG. 15 where the inner and outer rollers 14, 15 at a slat 9 are mounted to the chain 12 through brackets 21, whereas the slat 9 is mounted to the chain separately from the brackets 21. It is not necessary that the inner and outer rollers 14, 15 are located exactly below the slat 9, as seen from above. For example, the brackets 21 can be mounted to a link of the chain 12 between two slats 9.

The slats 9 are also supported in upward direction. In the embodiment as shown in FIG. 4 the outer roller 15 is supported upwardly by a segment 19a of an upwardly directed second guide face at the outer guide profile 10a and a segment 19b of the upwardly directed second guide face at the inner guide profile 10b. Both segments 19a, 19b together form the second guide face for upwardly supporting the slats 9, but the segments 19a, 19b are spaced in radial direction with respect to the central centerline 2a in this case. In this case the common second guide face 19 is located between the inner and outer rotational axes 16, 17 in radial direction with respect to the central centerline 2a.

It is noted that in the embodiment as shown in FIG. 4 the inner guide profile 10b has a face that is directed to the central centerline 2a, which contacts the inner roller 14, but under operating conditions the radial forces are primarily guided via the outer roller 15 and the first guide face 18 of the outer guide profile 10*a*.

Figure 5:
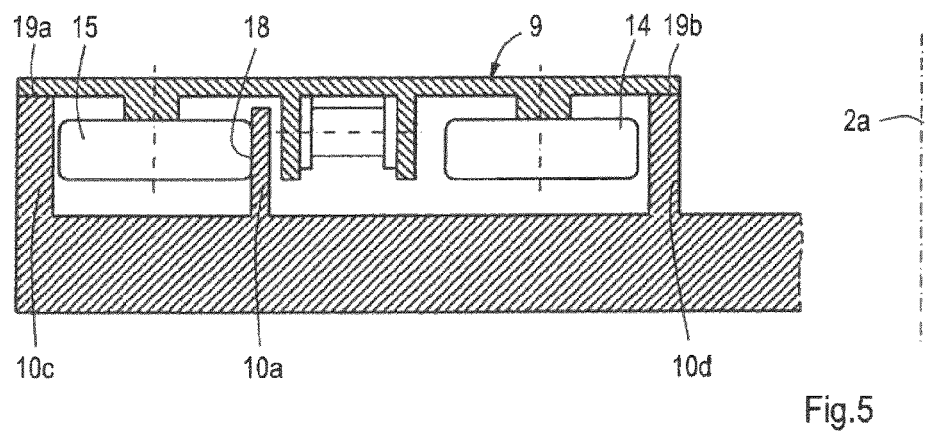
FIGS. 5-16 are similar sectional views as FIG. 4 of varying embodiments.

In the embodiment as shown in FIG. 5 it can be seen that the inner roller 14 does not contact any guide profile. In this case the outer roller 15 again cooperates with the outwardly directed first guide face 18. The inner roller 14 and outer roller 15 are not directly supported by the frame 1 in upward direction, but the segments 19*a*, 19*b* of the second guide face are now located outside the inner roller 14 and the outer roller 15 in the radial direction with respect to the central centerline 2*a*. The segments 19*a*, 19*b* of the second guide face support the opposite end portions of the slat 9 and are part of a further outer guide profile 10*c* and a further inner guide profile 10*d*. The inner guide profile 10*b* does have no function and is omitted in this embodiment.

Figure 6:
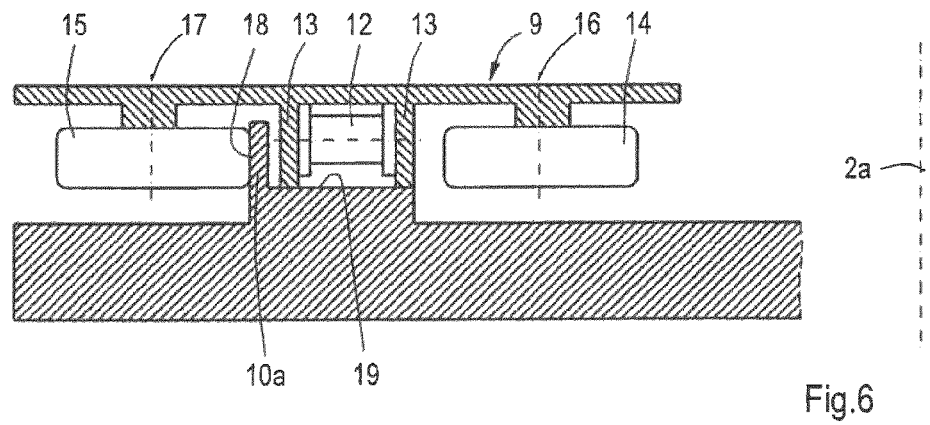

FIG. 6 shows an embodiment wherein the inner roller 14 does neither contact a guide profile. The outer roller 15 cooperates with the outwardly directed first guide face 18. The vertical flanges 13 of the slat 9 slide on the second guide face 19, which is now located between the inner roller 14 and the outer roller 15 in radial direction with respect to the central centerline 2*a*. In axial direction of the inner and outer rotational axes 16, 17 the second guide face 19 is located at the rollers 14, 15, but this can also be higher or lower.

In the embodiments as shown in FIGS. 7-14 it can be seen that the frame is provided with a downwardly directed guide face 20, which may comprise a plurality of segments 20*a*, 20*b*. The downwardly directed third guide face 20 serves to retain the slats 9 down under operating conditions, which can be of particular importance in case of slats 9 which do not carry a product. Similar to the second guide face 19, the third guide face 20 is spaced from the first guide face 18 at a slat 9.

Figure 7:
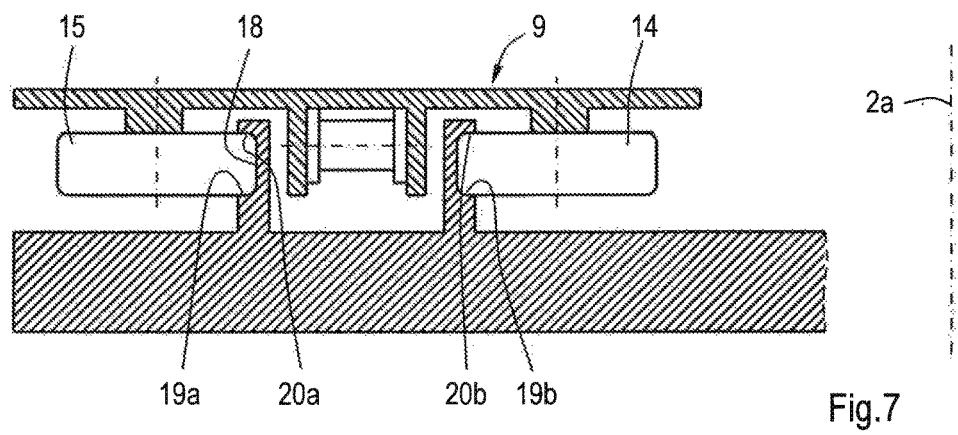
Figure 8:
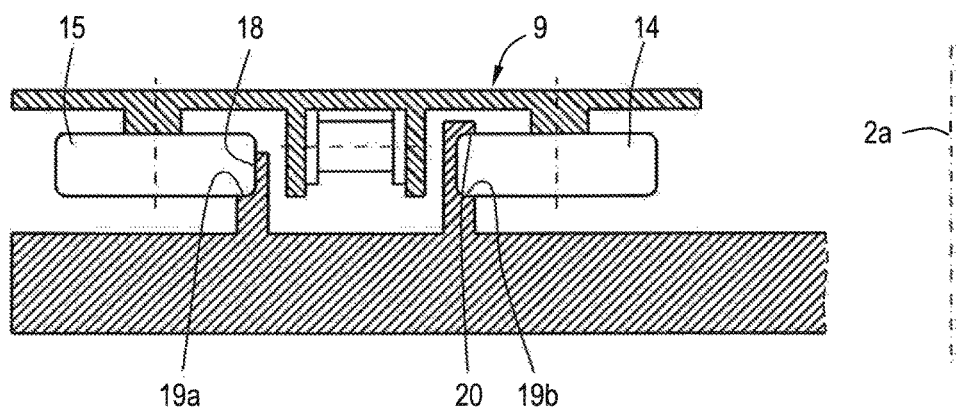

The embodiments of FIGS. 7 and 8 have great similarities. FIG. 7 shows that the third guide face is divided into two segments 20*a* and 20*b*, which cooperate with upwardly directed sides of the inner and outer rollers 14, 15. In this case it is portions of the sides of the inner and outer rollers 14, 15 which are located closest to each other. FIG. 8 shows that only the upwardly directed sides of the inner rollers 14 cooperate with the third guide face 20. In both embodiments the third guide face 20 at a slat 9 is spaced from the first guide face 18 in both the radial direction and axial direction of the outer rotational axis 17.

Figure 9:
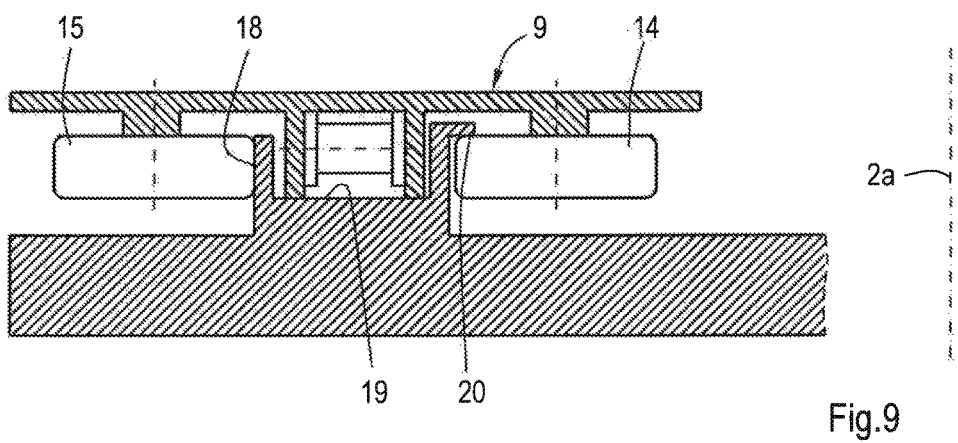

The embodiment according to FIG. 9 shows similarity with FIG. 6 in respect of the upwardly directed support of the slats 9. In order to retain the slats down the third guide face 20 cooperates with portions of the upwardly directed sides of the inner rollers 14, which portions are located closest to the outer rollers 15.

Figure 10:
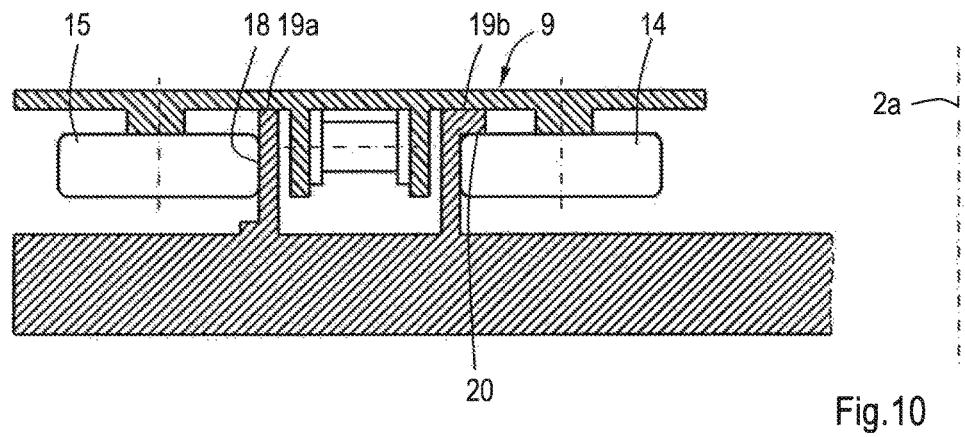

The embodiment according to FIG. 10 is different from the one according to FIG. 9 in respect of the location of the second guide face. In FIG. 10 it can be seen that the second guide face comprises two segments 19*a*, 19*b* which are located between the inner and outer rotational axes 16, 17 in radial direction with respect to the central centerline 2*a*.

Figure 11:
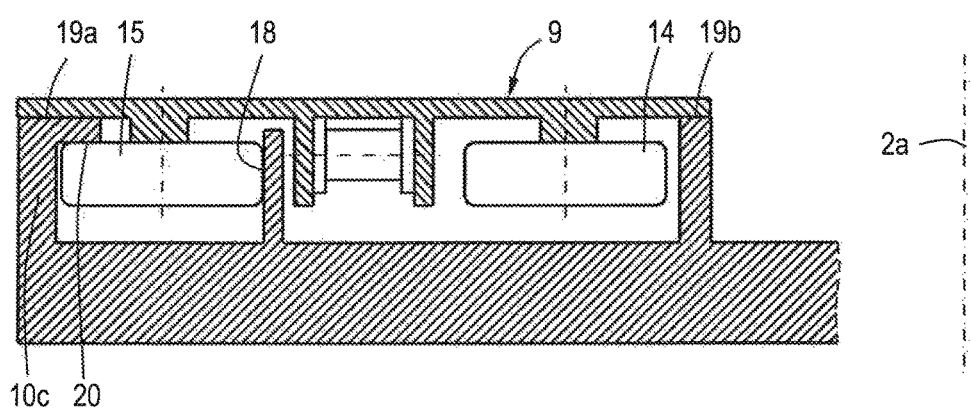

The embodiment according to FIG. 11 shows similarity with FIG. 5 in respect of the upwardly directed support of the slats 9. For retaining the slats 9 down the further outer guide profile 10*c* is provided with the downwardly directed third guide face 20 which cooperates with portions of the upwardly directed sides of the outer rollers 15, which portions are located at greatest distance from the central centerline 2*a*.

Figure 12:
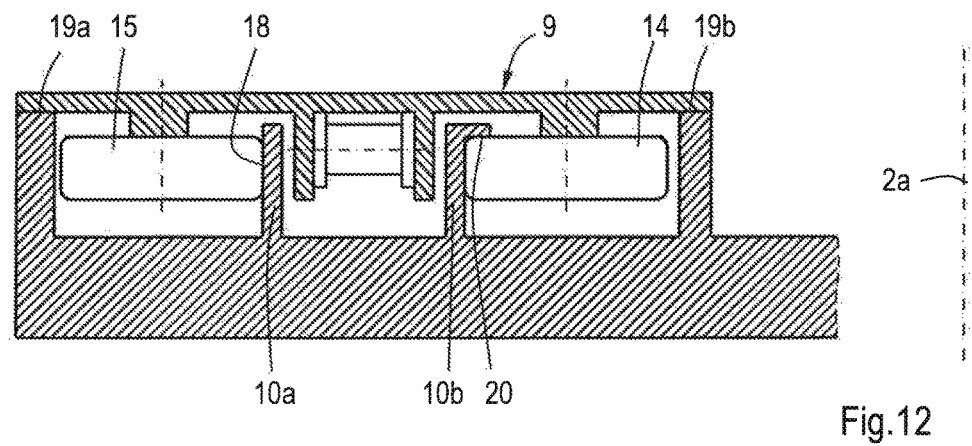

The embodiment according to FIG. 12 is different from that according to FIG. 11 in respect of the location of the third guide face 20, which is now located at the inner guide profile 10*b*. The third guide face 20 cooperates with portions of the upwardly directed sides of the inner rollers 14, which portions are located closest to the outer rollers 15.

Figure 13:
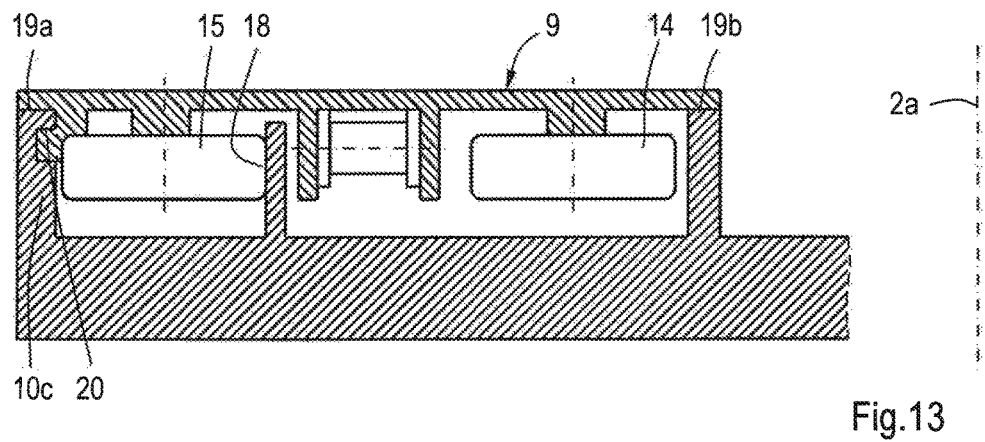

The embodiment according to FIG. 13 has similarity to that according to FIG. 11, but the third guide face 20 does not necessarily cooperate with the outer rollers 15 of the slats 9, but with portions of the slats 9 to which the outer rollers 15 are mounted. In this case the ends of the slats 9 which are directed away from the slats 9 are provided with an undercut in which a protrusion of the further outer guide profile 10*c* is received, which protrusion is directed to the central centerline 2*a*. The upper side of the protrusion forms a segment 19*a* of the upwardly directed second guide face and the lower side of the protrusion forms the downwardly directed third guide face 20.

It is noted that the segments 19*a*, 19*b* of the upwardly directed second guide face as shown in FIGS. 5, 11, 12 and 13 extend in the radial direction with respect to the central centerline 2*a* up to the outer edges of the slats 9, but this is not necessary. One and/or both segment(s) 19*a*, 19*b* may extend beyond the outer edge(s) as seen from the center of the slats 9, or the slats 9 may extend beyond one and/or both segments 19*a*, 19*b*.

Figure 14:
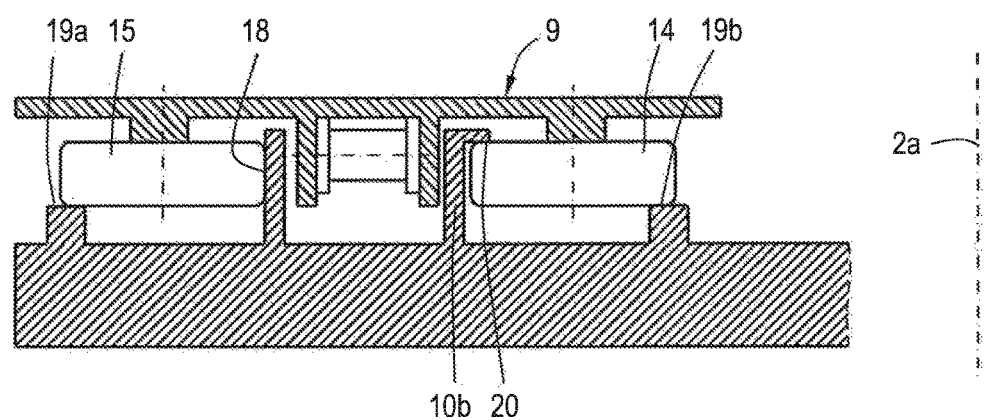

In the embodiment according to FIG. 14 the inner rollers 14 as well as the outer rollers 15 are supported in upward direction through segments 19*a*, 19*b* of the upwardly directed second guide face. The segments 19*a*, 19*b* cooperate with portions of the downwardly directed sides of the inner rollers 14 and the outer rollers 15 which are located at greatest distance from each other. The third guide face 20 is located at the inner guide profile 10*b* and cooperates with portions of the upwardly directed sides of the inner rollers 14 which are located closest to the outer rollers.

Figure 16:
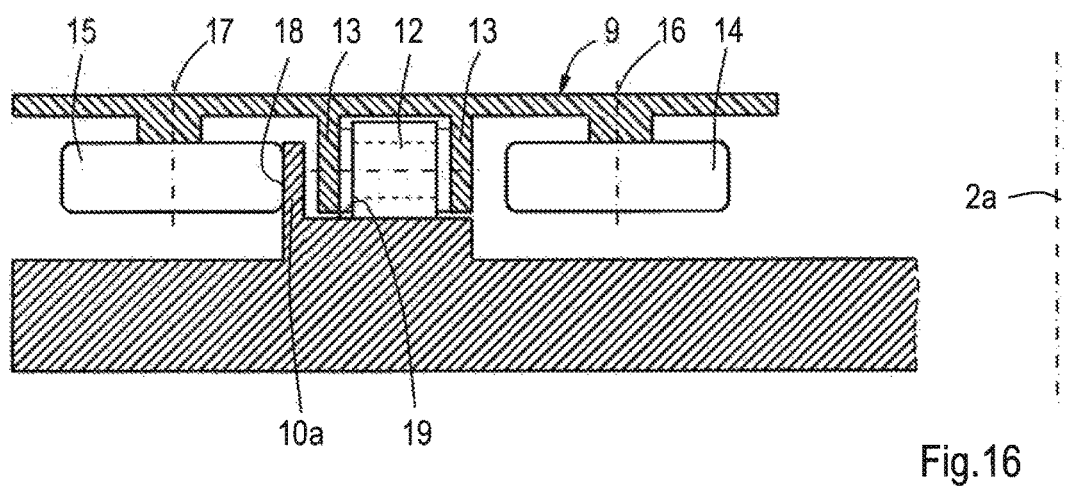

FIG. 16 shows an embodiment which has great similarity to the one according to FIG. 6. In this case it is not the vertical flanges 13 of the slat 9 which slide on the second guide face 19, but the chain 12 is supported by the guide face 19. In the embodiment according to FIG. 16 the chain 12 is a roller chain and the rollers are supported by the second guide face 19. A comparable embodiment is also conceivable for the embodiment according to FIG. 9.

The invention is not limited to the embodiment shown in the drawings and described hereinbefore, which may be varied in different manners within the scope of the invention. For example, it is possible that not all adjacent slats are provided with an inner roller and an outer roller.

The invention claimed is:

1. A conveyor for conveying products in vertical direction, comprising:
   a frame; and
   a drivable conveyor belt being supported by the frame and following a helical track in a direction of conveyance about a central centerline and being provided with slats which are movable with respect to each other and have a support face at their upper sides;
   wherein inner rollers and outer rollers are present at a lower side of the conveyor belt which inner and outer rollers are rotatable about inner axes of rotation and outer axes of rotation, respectively, which are angled with respect to the support faces; and
   wherein the outer rollers are located at a larger distance from the central centerline than the inner rollers;
   wherein the frame is provided with a plurality of guide faces wherein a first guide face is configured to support the outer rollers in an outward direction with respect to the central centerline which first guide face is radially directed to face in the outward direction relative to the central centerline; and wherein a second guide face is configured to support the conveyor belt in an upward direction, which second guide face lies at a distance from the first guide face.

2. The conveyor according to claim 1, wherein the second guide face is at least partly located at at least one of the inner rollers and the outer rollers so as to support the conveyor belt in the upward direction via at least one of the inner rollers and the outer rollers.

3. The conveyor according to claim 1, wherein the second guide face is at least partly located outside the inner rollers and the outer rollers in the radial direction with respect to the central centerline.

4. The conveyor according to claim 1, wherein at a slat the second guide face is at least partly located at a distance from the first guide face in an axial direction of the outer axis of rotation.

5. The conveyor according to claim 1, wherein the inner rollers and the outer rollers are located at opposite sides of the central centerline of the conveyor belt along the helical track.

6. The conveyor according to claim 1, wherein the second guide face comprises outer circumferences of supporting rollers, which are rotatable about respective axes of rotation which extend in the radial direction with respect to the central centerline.

7. The conveyor according to claim 1, wherein at least one of the inner and outer axes of rotation extend perpendicularly to the respective support faces.

8. The conveyor according to claim 1, wherein each of the slats is provided with an inner roller and an outer roller, which are mounted directly on a portion of the slat, which portion comprises the support face.

9. The conveyor according to one claim 1, wherein the slats are elongated and a longitudinal direction of the slats extends perpendicular to the direction of conveyance.

10. The conveyor according to claim 1, wherein the second guide face is at least partly located between the inner and outer axes of rotation in a radial direction with respect to the central centerline.

11. The conveyor according to claim 10, wherein the second guide face is at least partly located between the inner rollers and the outer rollers in the radial direction with respect to the central centerline.

12. The conveyor according to claim 1, wherein the second guide face is at least partly located outside a range between the inner and outer axes of rotation in the radial direction with respect to the central centerline.

13. The conveyor according to claim 12, wherein the slats extend beyond the second guide face as seen from the central centerline of the conveyor belt in their longitudinal direction.

14. The conveyor according to claim 1, wherein the second guide face comprises at least two segments which are located at a distance from each other in the radial direction with respect to the central centerline.

15. The conveyor according to claim 14, wherein the segments are located substantially symmetrical with respect to the central centerline of the conveyor belt.

16. The conveyor according to claim 1, wherein the inner and outer axes of rotation lie substantially in a single plane at a slat, which plane extends in the radial direction with respect to the central centerline.

17. The conveyor according to claim 16, wherein the plane substantially runs through the central centerline in a longitudinal direction of the slat.

18. The conveyor according to claim 1, wherein the frame is provided with a third guide face configured to hold down the slats, which third guide face is directed downwardly and located at a distance from the first guide face.

19. The conveyor according to claim 18, wherein the third guide face is positioned to cooperate with at least one of the outer rollers and the inner rollers.

20. The conveyor according to claim 19, wherein the third guide face cooperates with the inner rollers in portions of sides thereof which are located closest to the outer rollers.

21. The conveyor according to claim 1, wherein the slats are connected to each other at the central centerline of the conveyor belt along the helical track.

22. The conveyor according to claim 21, wherein the slats are connected to each other via a connecting member which follows the helical track.

23. The conveyor according to claim 22, wherein the connecting member rests on the second guide face.

24. The conveyor according to claim 23, wherein the connecting member comprises a roller chain, of which the rollers are supported by the second guide face.

25. A conveyor for conveying products in vertical direction, comprising:
 a frame; and
 a drivable conveyor belt being supported by the frame and following a helical track in a direction of conveyance about a central centerline and being provided with slats which are movable with respect to each other and have a support face at their upper sides;
 wherein inner rollers and outer rollers are present at a lower side of the conveyor belt which inner and outer rollers are rotatable about inner axes of rotation and outer axes of rotation, respectively, which are angled with respect to the support faces; and
 wherein the outer rollers are located at a larger distance from the central centerline than the inner rollers;
 wherein the frame is provided with a plurality of guide faces wherein a first guide face is configured to support the outer rollers in an outward direction with respect to the central centerline which first guide face is radially directed to face in the outward direction relative to the central centerline; and
 wherein a second guide face is configured to support the conveyor belt through the outer roller in an upward direction, which second guide face is angled with respect to the first guide face.

* * * * *